Nov. 14, 1967    K. HEHL    3,351,980
BLOW MOLDING APPARATUS
Filed Nov. 29, 1963    4 Sheets-Sheet 1
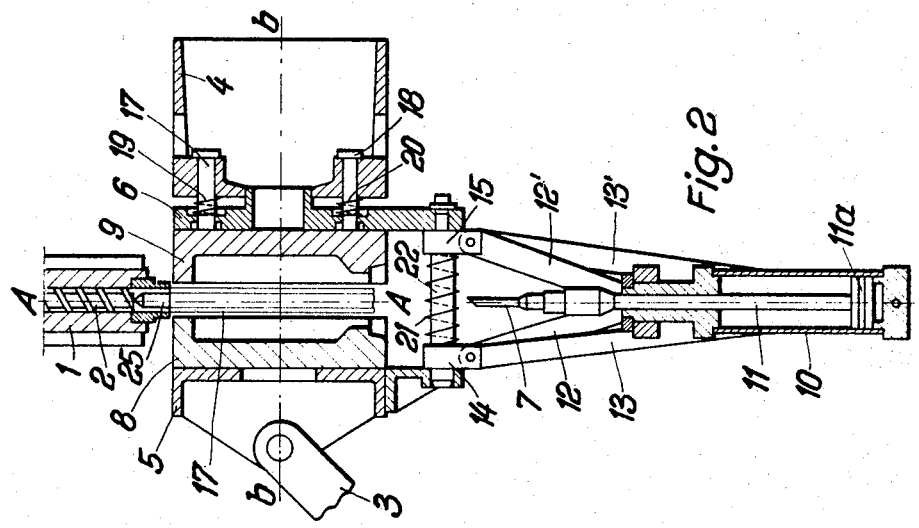
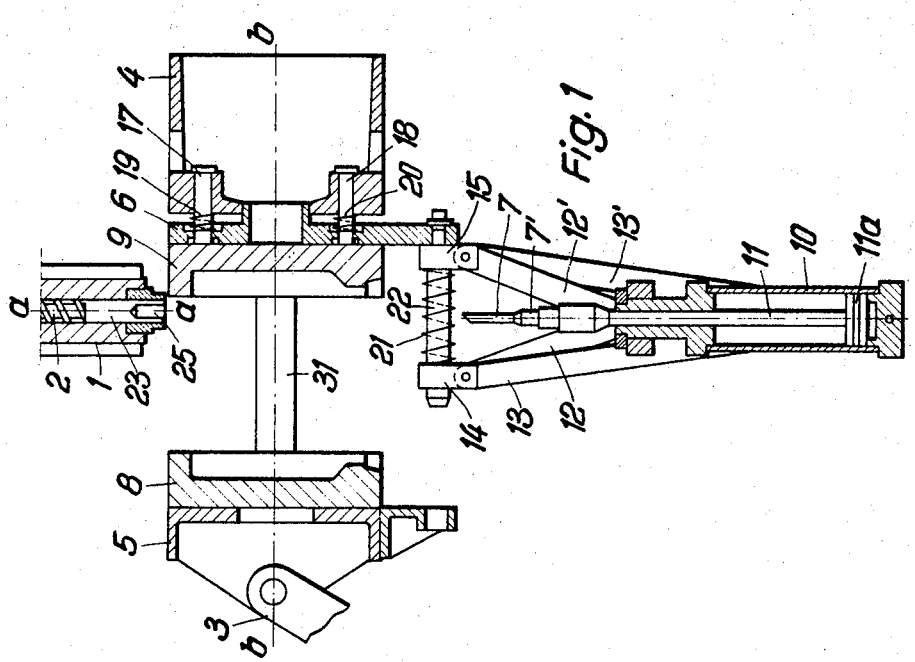
Inventor:
Karl Hehl
By: Spencer & Kaye
ATTORNEYS

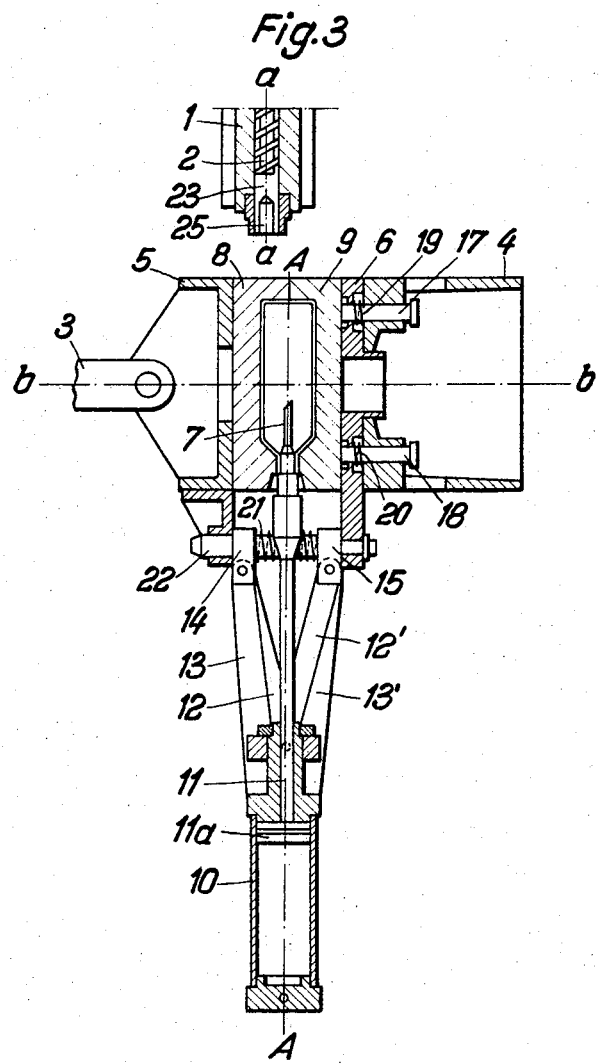

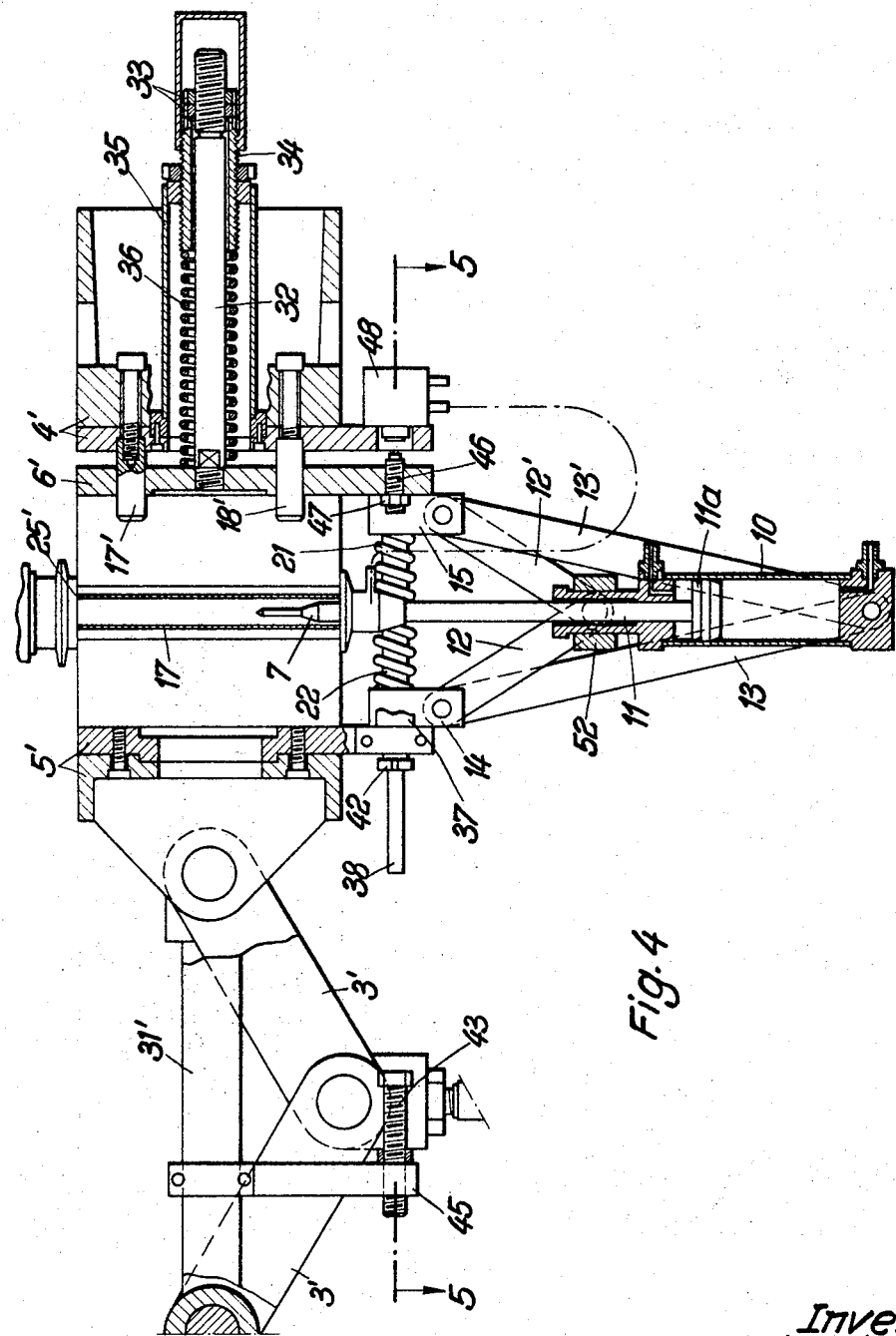

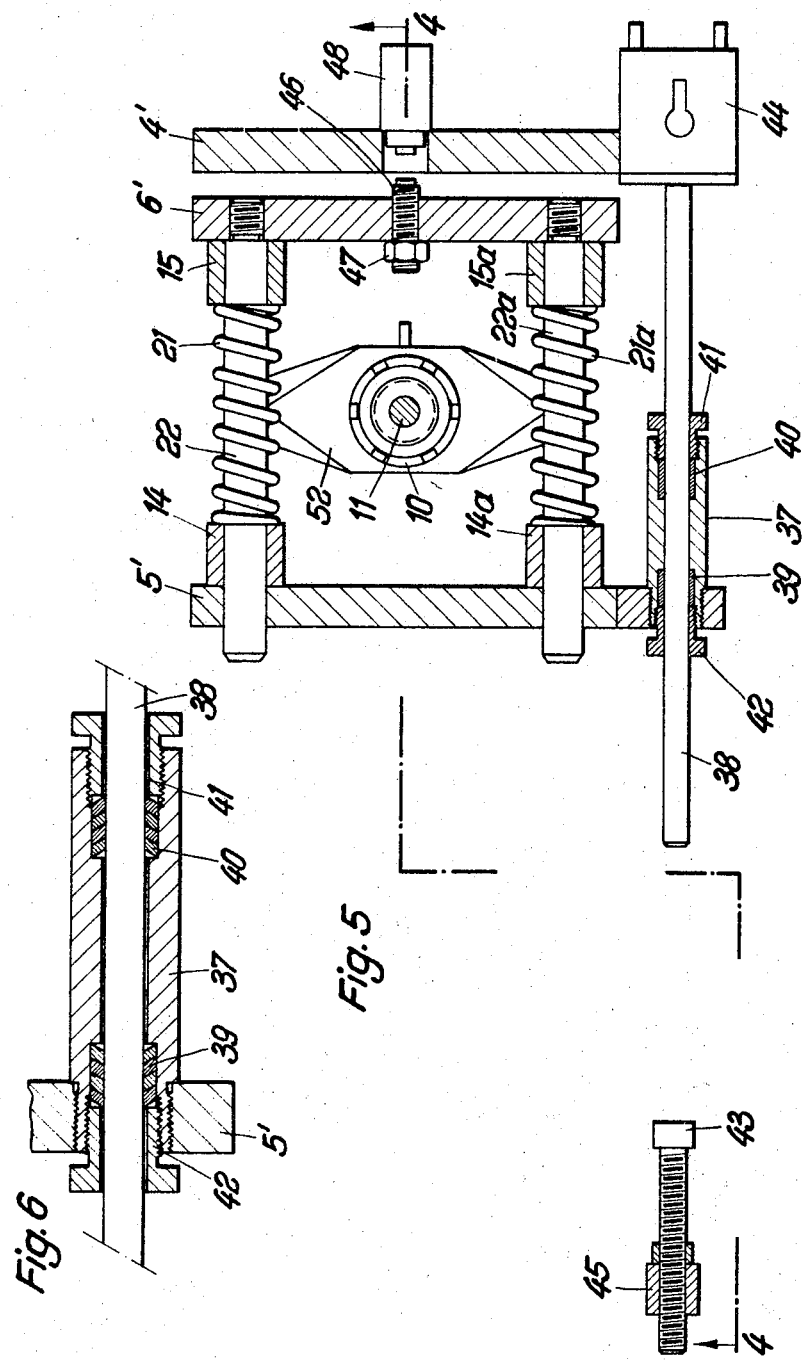

United States Patent Office 3,351,980
Patented Nov. 14, 1967

3,351,980
BLOW MOLDING APPARATUS
Karl Hehl, Lossburg, Wurttemberg, Germany, assignor to Arburg Maschinenfabrik Hehl & Sohne
Filed Nov. 29, 1963, Ser. No. 327,584
Claims priority, application Germany, Nov. 28, 1962, A 41,722; Feb. 12, 1963, A 42,311
11 Claims. (Cl. 18—5)

The present invention relates to an apparatus for making hollow articles of thermoplastic material by a blow molding process.

In blow molding processes, a tubular body is first formed by means of an extrusion press. Generally, the plastic mass is continuously pressed out through an annular nozzle of the plasticizing cylinder by means of a rotating conveyor screw.

It is the primary object of the present invention to provide an apparatus of the above type by means of which the hollow body can be produced in short time.

It is another object of the present invention to provide a blow molding apparatus in which the hollow article being made is given its final shape while the thermoplastic mass is at a temperature most favorable to its being worked.

With the above objects in view, the present invention resides in an apparatus by which the following steps can be carried out:

(A) The thermoplastic mass is transported by means of a conveyor screw arranged in the extrusion cylinder of an injection molding machine, and the material being conveyed is retained within the extrusion cylinder until the amount of material accumulated within the cylinder corresponds to the quantity of material needed to produce the hollow article to be produced.

(B) The amount of thermoplastic mass accumulated within the extrusion cylinder is then subjected to a sudden axial stroke of the conveyor screw and is forced through an annular nozzle, so that this mass is preformed into a tubular section.

(C) This tubular section is, at the instant at which it is formed, introduced into an open mold which, in the direction in which the section moves as it comes out of the extrusion cylinder, is divided into two parts.

(D) After the blowing nozzle has been introduced and after the mold has been closed, the tubular section within the mold is blown up into its final configuration.

(E) The injection/blowing cycle of steps (A) to (D) is periodically repeated, the timing of the steps being such that step (A) is carried out at the same time as step (D) of the prior cycle.

In comparison with heretofore known methods, the method described above has the advantage that, thanks to the periodic accumulation and temporary storing of thermoplastic material in the extrusion cylinder and the abrupt single-stroke extrusion of a tubular section having the correct amount of material, i.e., the extrusion of tubular sections whose volume corresponds to the volume of the finished articles ultimately to be produced, the time interval between the instant at which the plastic material leaves the injection cylinder—at which time the mass is at the temperature at which it best lends itself to being shaped—and the instant at which the article is given its ultimate configuration is very materially reduced. The reason for this is that the tubular section is subjected to the blowing step at a very early stage of cooling, and certainly at a much earlier stage in the cooling process than in heretofore known blow molding methods. This brings with it yet another advantage, namely, that, since the tubular section is still at a temperature at which it very readily lends itself to being shaped, the finished article will more closely match the shape of the mold within which it is blown, i.e., thanks to the present invention, it is possible to manufacture the article more accurately than before. Moreover, the wall thickness of the article will be kept more uniform than was possible prior to the present invention.

A blow molding apparatus according to the present invention and capable of carrying out the above process may be described, briefly, as incorporating the following structural features:

The apparatus incorporates support means, a tube extrusion unit mounted on the support means, and a mold clamping unit and a blow nozzle unit. The mold clamping unit clamps two mold members which together form the mold for receiving a tubular section extruded by the extrusion unit and includes first and second plate means for holding the two mold members, respectively, the two plate means being mounted on the support means with the second plate means being movable toward and away from the first plate means. The blow nozzle unit incorporates a blow nozzle movable into and out of an operative position in which the nozzle extends into the interior of a tubular section extruded by the extrusion unit while such tubular section is received by the mold, the blow nozzle unit being mounted on one of the two plate means and being connectible to the other of the plate means when the two plate means close about the tubular section extruded by the extrusion unit.

Additional objects and advantages of the present invention will become apparent upon consideration of the following description when taken in conjunction with the accompanying drawings in which:

FIGURE 1 is a sectional view of an apparatus according to the present invention, the parts being shown at the end of the above-described step (A).

FIGURE 2 is a sectional view of the apparatus of FIGURE 1 but showing the parts at the end of step (B).

FIGURE 3 is a sectional view of the apparatus of FIGURES 1 and 2 but showing the parts at the end of step (D).

FIGURE 4 is a sectional view of a modified embodiment of the apparatus, taken substantially along the line 4—4 of FIGURE 5, showing the parts at the beginning of step (D).

FIGURE 5 is a sectional view of the apparatus of FIGURE 4, taken substantially along the line 5—5 of FIGURE 4.

FIGURE 6 is a sectional view of a detail incorporated in the structure of FIGURE 5.

Referring now to FIGURES 1 to 3, the same show only the nozzle end portion of a conventional extrusion unit. The axis of this extrusion unit is indicated at a—a, and the unit itself is shown as being oriented vertically above a mold clamping mechanism whose axis b—b extends horizontally. The mold clamping unit comprises a pair of tie rods 31, only one of which is shown in FIGURES 1 to 3, on which tie rods there is arranged a mold member clamping plate 5 adapted to hold a mold member 8, a further mold member clamping plate 6 adapted to hold a second mold member 9, and a stationary support 4. The plate 6 is resiliently attached to the support 4, while the plate 5 is acted on, via a linkage 3, by a suitable hydraulic or pneumatic drive (not illustrated). In FIGURES 1 to 3, the plate 6 is centered with respect to the support 4 by means of a centrally positioned, cylindrical boss portion extending rearwardly into a correspondingly shaped receiving opening. This centering is aided by guide pins 17, 18, which are anchored to plate 6. These pins 17, 18, also serve as carriers for coil springs 19, 20, which serve to establish the resilient connection between the plate 6 and the support 4.

In the embodiment of FIGURES 4 to 6, in which parts corresponding to those of FIGURES 1 to 3 are indicated by the same reference numerals carrying primes, the resiliently mounted plate 6' is supported by pins 17', 18', which are attached to the support 4'. Arranged behind the plate 6' is a rod 32 which extends parallel to the direction in which the mold opens, i.e., parallel to axis b—b. The distance which the plate 6' can move axially with respect to the support 4' is limited by a stop member 33 whose position along rod 32 is adjustable. When the plate 6' and the support 4' are maximally spaced apart, the stop member 33 abuts against an abutment 34 which is rigidly connected to the support 4' via a tube 35. The rod 32 also serves as a carrier for a spring 36 which is interposed between the abutment 34 and the plate 6'. The abutment 34 is threadedly connected with the free end of tubular protective sheath 35, so that the force which the spring 36 exerts can be regulated by means of the sheath 35.

Each of the embodiments of FIGURES 1 to 3 and FIGURES 4 to 6 also incorporates, as a third unit, the blow nozzle mechanism which incorporates the blow nozzle 7 that is introduced into the parting plane of the mold constituted by the above-mentioned mold members 8 and 9. The mold clamping unit and the blow nozzle unit are positively connected to each other.

The blow nozzle mechanism comprises a pressure cylinder 10 within which slides a piston 11a whose piston rod carries the nozzle 7, the latter being provided with a calibrating shaft 7'. The pressure cylinder 10 is freely carried by a symmetrical linkage which itself is pivotally connected with the movable and the resiliently mounted mold member clamping plates 5, 6 (FIGURES 1 to 3); 5', 6' (FIGURES 4 to 6). The plane of symmetry of the linkage is parallel to the parting plane of the mold 8, 9. The linkage incorporates two pairs of levers 12, 12'; 13, 13', of different lengths which lie in the vertical plane of the pivotal connecting elements 14, 15 (see FIGURE 5), as well as two further pairs of levers (not visible in the figures) identical to the levers 12, 12'; 13, 13', which further pairs of levers lie in the vertical planes of the pivotal connecting elements 14a, 15a (see FIGURE 5). The ends of the shorter lever pairs 12, 12', which are connected to the cylinder 10 are pivotally attached to a part 52 which itself is movable, within certain limits, in the direction of the axis of the cylinder.

The pivotal connection of the levers with the plates 5, 6; 5', 6' is, as described above, established by connecting elements 14, 15, and 14a, 15a (FIGURE 5). These elements, when the apparatus is in the extruding position of FIGURE 2 and the blowing position of FIGURE 3, are form-closingly connected to the respective plates under the influence of coil springs 21, 21a, which springs are carried by tie rods 22 and 22a (see FIGURE 5) anchored to the plate 6, 6'. When the mold clamping mechanism is fully open (FIGURE 1), the connecting elements 14, 14a, no longer lie against the plate 5 inasmuch as this plate is now removed from the connecting elements 14, 14a, which have now come into engagement with abutments (not shown) carried by tie rods 22, 22a. So long as the connecting elements 14, 14a, are under the influence of the coil springs 21, 21a, and lie flush against the plate 5, 5', the blow nozzle 7 will, during closing or opening of the mold, always move in such a manner as to be exactly in alignment with the plate A—A that is midway between the two mold members 8 and 9. The nozzle 7 will thus always be in this center plane A—A; this is true while the apparatus is in the extruding position (FIGURE 2) or in the blowing position (FIGURE 3) as well as any position therebetween. Consequently, the nozzle 7 can, in each phase of the closing movement of the mold clamping mechanism, be positioned exactly in alignment with the parting plane of the mold 8, 9. The nozzle can be moved into its blowing position either before or after the extrusion of the tubular section 17 out of the nozzle 25. In any event, the neck portion of the hollow body to be manufactured will be shaped exactly when the mold members 8, 9, close about the calibrating shaft 7' of the nozzle 7.

In practice, the closing movement of the mold clamping mechanism is controlled by electromechanical control means (not shown) and is divided into two parts which occur at different times. In the embodiments of FIGURES 1 to 3, FIGURE 2 shows the position of the mold members at the end of the first part of the closing movement of the mold clamping mechanism. The mold clamping mechanism will remain in this position for an instant, during which the extruded section is placed between the mold members 8 and 9. In this extruding position, the annular nozzle 25 will be located in the immediate vicinity of the mold members 8, 9, without, however, actually touching the same. In order to stop the downward motion of the extrusion cylinder 1 (corresponding to the leftward motion, as viewed in FIGURES 10 and 11), the tie rods 26, 27, will, in practice, carry the above-mentioned, suitably positioned abutments 26a, 27a, which are engaged by the transverse bridge 1b just before the nozzle 25 would, but for the presence of these abutments, engage the mold members 8, 9.

FIGURES 5 and 6 show a guide sleeve 37 which is fixedly secured to the plate 5'. Arranged within a bore of this sleeve 37 is a control rod 38 which is axially displaceable relative to the sleeve 37. The sleeve 37 also carries two stacks of somewhat conically oriented or dished friction rings 39, 40, made of plastic material. These stacks of friction rings 39, 40, may be compressed by means of hollow screws 42, 41, which are threaded into opposite ends of the sleeve 37. When the stacks of friction rings 39, 40, are compressed, they tend to assume a flatter orientation, as a result of which a greater force is exerted on the control rod 38. In this way, the friction with which the rod is slidable within sleeve 37 can be regulated.

Arranged in the path of the control rod 38, as the same moves with plate 5', is—on the left, as viewed in FIGURE 5—an adjustable abutment 43 and—on the right, as viewed in FIGURE 5—a stationary control valve 44 for controlling the feeding of the pressure fluid medium to cylinder 10. The abutment is connected via a mounting element 45, with one of the two tie rods 31' of the mold clamping mechanism. The control valve 44 is attached to the support 4'.

The resiliently mounted plate 6, 6', carries an actuating pin 46 whose axial position is adjustable and which, by means of a lock nut 47, can be maintained in any desired axial position. In alignment with the axis of the pin 46 is a valve 48 which controls the supply of air under pressure to the nozzle 7. The component identified by reference numeral 48 may be an electric switch which is actuated by the pin 46, which switch, in turn, controls the valve mechanism in the air hose connecting a compressor (not shown) with the nozzle 7.

*Operation*

The apparatus operates as follows:

While a previously extruded tubular section is given its final shape by the blowing step (e.g., FIGURE 3), the extrusion cylinder 1, while the same is spaced from the mold 8, 9, accumulates, due to the rotation of conveyor screw 2, a given dosage 23 of plastic material. This mass of material is accumulated while the nozzle 25 is closed. During the accumulation of material, the extrusion cylinder 1 is continuously moved in a direction toward the mold members 8, 9. When the dosage 23 has reached the point at which the volume is equal to that of the finished article, and when—at the same time—the article which has been finally shaped from the tubular section extruded during the prior cycle has sufficiently set or hardened within the mold 8, 9, the mold is opened and the finished article ejected. The closing movement of the mold clamping mechanism is initiated by an electrical signal triggered by the ejected article. At the end of the first part of this closing movement, the apparatus is in the position shown, for example, in FIGURE 2. The mold members 8, 9, remain in this position until the thermoplastic material 23 which has accumulated in the plasticizing cylinder 1 is abruptly extruded under the action of the piston 24 which moves the conveyor screw 2 axially with respect to the plasticizing cylinder 1. During this work stroke, the conveyor screw 2 acts as an extruding piston which pushes the dosed quantity 23 through the nozzle 25, thereby to form the extruded tubular section 17. Before the position of FIGURE 2 is reached, or at this position, or at the start of the second portion of the closing movement—depending on the axially adjusted position of the sleeve 37—the control rod 38 engages the control valve 44 and moves the same to its open position, thereby to cause pressure fluid to be fed into cylinder 10 which, in turn, moves the blow nozzle into its operating position (e.g., FIGURE 3). The blow nozzle itself is provided with a closure valve which, when the nozzle is pressed against the mold members, opens automatically.

As the mold clamping mechanism moves to its fully closed position, the mold members 8, 9 engage the calibrating shaft 7' of the blow nozzle, so that the neck portion of the hollow article being formed will be shaped exactly as required. Before the mold members 8, 9, reach their fully closed position, the actuating pin 46 engages the control component 48 thereby establishing communication between the compressor (not shown) and the blow nozzle. The compressed air thus flows into the interior of the extruded tubular section 17 which itself is within the mold so that the section 17 is forced against the inner surfaces of the mold members 8, 9. This corresponds to the above-described step (D), during which a new dosed quantity 23 of plastic material will accumulate in the extrusion cylinder 1 which, by this time, will have been retracted into a position away from the mold members 8 and 9.

After the blowing step has been completed, the mold clamping mechanism is opened. The actuating pin 46 will disengage itself from the control component 48, thereby cutting off the supply of compressed air to the nozzle 7. Also, the control rod 38 will disengage itself from control valve 44, thereby causing the cylinder 10 to be fed from the opposite end so that the piston 11a is moved down and the blow nozzle is withdrawn from the space between the mold members 8, 9, to assume the position shown in FIGURE 1. The connecting links 14, 14a, are returned to their starting position under the influence of springs 21, 21a. As the opening movement continues, the control rod 38 engages the abutment 43 and is moved, relative to sleeve 37, back to its starting position.

It will be understood that the above description of the present invention is susceptible to various changes, modifications and adaptations, and the same are intended to be comprehended within the meaning and range of the appended claims.

What is claimed is:

1. A blow molding apparatus for making hollow articles, said apparatus comprising, in combination:
   (A) support means;
   (B) a tube extrusion unit mounted on said support means;
   (C) a mold clamping unit for clamping two mold members which together form a mold for receiving a tubular section extruded by said extrusion unit, said mold clamping unit incorporating
      (i) first plate means for holding one of said two mold members and being mounted on said support means, and
      (ii) second plate means for holding the outer of the two mold members and being movably mounted on said support means toward and away from first plate means, said plate means being arranged to close about a tubular section extruded by said extrusion unit; and
   (D) a blow nozzle unit incorporating a blow nozzle movable into and out of an operative position in which said nozzle extends into the interior of a tubular section extruded by said extrusion unit while such tubular section is received by the mold, said blow nozzle unit being mounted on one of said plate means and connectible to the outer of said plate means when said two plate means close about the tubular section extruded by said extrusion unit.

2. A molding apparatus as defined in claim 1 wherein said blow nozzle unit is mounted on said first plate means.

3. A molding apparatus as defined in claim 1 wherein said first plate means are resiliently mounted on said support means.

4. A molding apparatus as defined in claim 1 wherein said blow nozzle unit incorporates a pressure cylinder, a piston slidably arranged within said pressure cylinder, a piston rod connected to said piston and carrying said blow nozzle, and a symmetrical linkage incorporating a plurality of pairs of levers of unequal lengths, one of the symmetrical halves of said linkage pivotally connecting said pressure cylinder to said first plate means and the other symmetrical half of said linkage pivotally connecting said pressure cylinder to said second plate means.

5. A molding apparatus as defined in claim 4 wherein the connection of said levers to said plate means is effected by means of pivotal connecting links and spring means which press said links to the respective plate means and wherein the connection of said levers to said pressure cylinder includes a member slidably mounted on said pressure cylinder for movement in a direction parallel to the axis thereof, the shorter of said levers of unequal lengths being pivotally connected to said slidable element.

6. A molding apparatus as defined in claim 3, wherein said mold clamping unit incorporates means for limiting the amplitude of movement of said resiliently mounted first plate means, said limiting means comprising a stop member extending rearwardly of said first plate means and an abutment member fixedly connected to said support means, the position of at least one of said two last-mentioned members being adjustable.

7. A molding apparatus as defined in claim 6, wherein said stop member is carried by a rod affixed to said first plate means, said rod carrying a spring which is interposed between said first plate means and said abutment member, whereby the tension of said spring may be regulated by varying the position of said stop member with respect to said rod.

8. A molding apparatus as defined in claim 1, further comprising a control rod carried by said second plate means for movement therewith, said control rod being axially displaceable, under friction, relative to said second plate means, there being arranged in the path of said control rod an adjustable abutment which is engageable by one end of said control rod, the other end of said control rod being arranged to engage a control valve for controlling a pressure cylinder for moving said blow nozzle into and out of said operative position thereof.

9. A molding apparatus as defined in claim 8, wherein said second plate means carries a sleeve within which said control rod is slidably arranged, said sleeve also carrying at least one stack of conically inclined friction rings through which said control rod extends and hollow screw means for regulating the inclination of said friction rings and hence the frictional force with which said friction rings engage said control rod.

10. A molding apparatus as defined in claim 1, wherein said mold clamping unit incorporates means for moving said two plate means together thereby to close the mold.

11. A molding apparatus as defined in claim 10, wherein said means for closing the mold divide the closing movement into two parts.

References Cited
UNITED STATES PATENTS

| | | | |
|---|---|---|---|
| 2,750,625 | 6/1956 | Colombo | 18—5 |
| 2,930,079 | 3/1960 | Parfrey | 18—5 |
| 2,975,473 | 3/1961 | Hagen et al. | 18—5 X |
| 2,998,621 | 9/1961 | Adams et al. | 18—5 |
| 3,093,861 | 6/1963 | Rex | 18—30 |

WILBUR L. McBAY, *Primary Examiner.*